May 29, 1928.
H. P. SCANLON ET AL
JAR
1,671,489
Filed Aug. 13, 1925
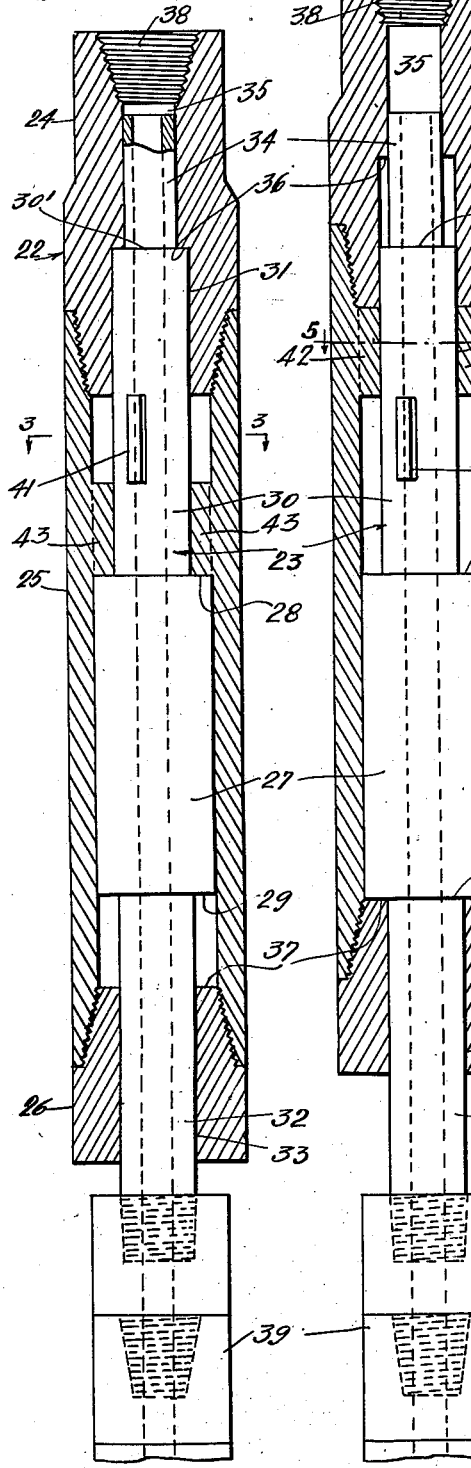
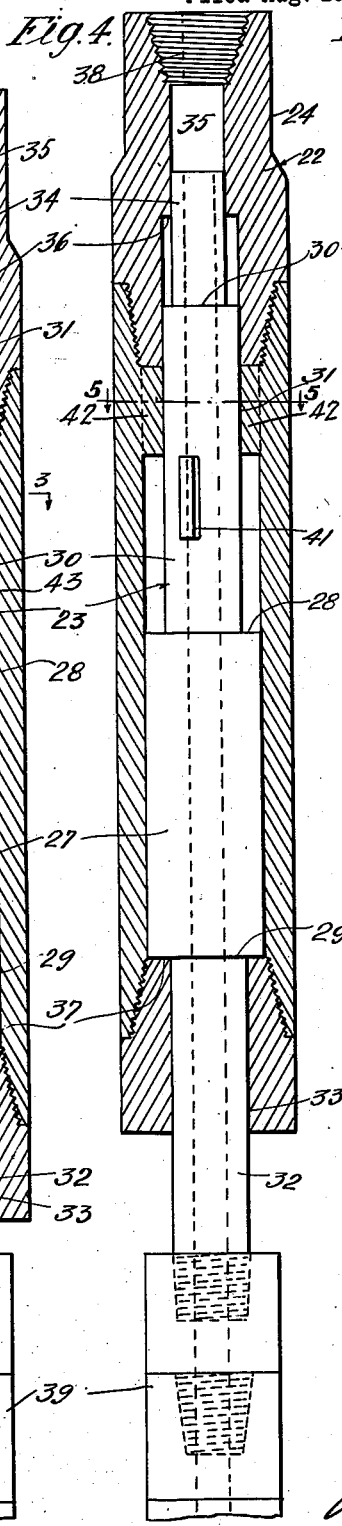
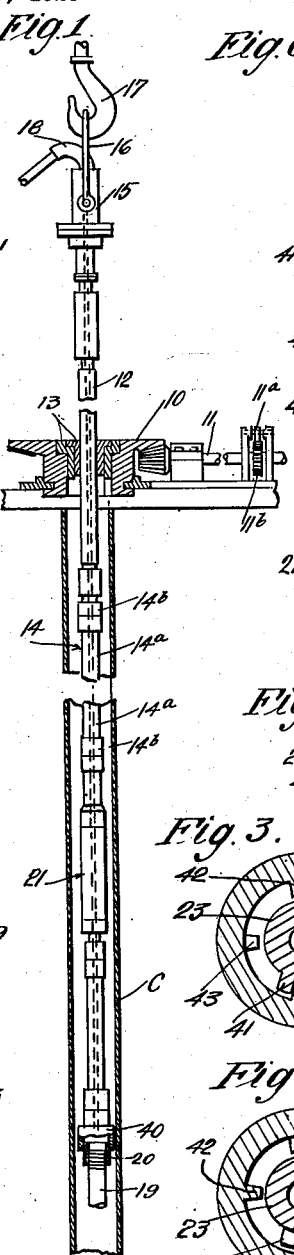
Inventors
Henry P. Scanlon
Elmer R. Price
Attorney Patented May 29, 1928.

1,671,489

UNITED STATES PATENT OFFICE.

HENRY P. SCANLON AND ELMER R. PRICE, OF VENTURA, CALIFORNIA.

JAR.

Application filed August 13, 1925. Serial No. 49,880.

This invention relates generally to devices for use in the practice of drilling oil or artesian wells by the well-known rotary method, and is more particularly concerned with devices known as "jars" employed for loosening tools stuck in the hole and in fishing for lost tools, drill stem or casing.

Devices adapted to impart a loosening shock or jar to a lost tool by relative endwise movement of the two telescopic members, have long been known. However, such devices are unsuitable for successfully coping with situations where rotational shock must be imparted to the lost tool or an element associated therewith.

For instance, suppose the "lost" portion of a broken drill stem has on its upper end a threaded collar or member which must be unscrewed and removed before the fishing tool, proper, may take hold, and that this collar successfully resists all usual efforts to unscrew it. Or suppose a tool is stuck in the hole so it may neither be rotated or moved longitudinally clear of an obstruction. In such situations the use of an ordinary, straight-line reciprocatory jar often has no beneficial effect and may even aggravate matters.

It is the principal object of the present invention to provide a device especially adapted to meet such situations, as well as others which need not be described here since they will be apparent to those skilled in the art. Generally, the device may be described as means for imparting a rotational jar or shock to the lost tool or element which is to be rotated.

In the following description we have chosen to describe the device in connection with the operation of unscrewing an element from a lost tool or string, and in such a situation it will be readily seen how such a rotational shock applied in the proper direction to the element, tends to loosen the threaded connection. As here disclosed, the device embodying our invention includes a telescopic joint, one of the two members making it up being adapted for connection with the fishing stem and the other being adapted for connection with the fishing tool or directly with a tool or pipe stuck in the hole.

The two members have shoulders adapted to coact in such a manner that said members are capable of limited relative rotation in given directions when the joint is in full expanded or full contracted position. By placing the fishing stem and the connected member under torsional strain and then moving them longitudinally with respect to the other member until the joint is fully expanded or contracted, the joint automatically "trips", that is, the stem-carried part of the device is freed to rotate rapidly until stops or the two members engage, there being a very considerable rotational shock or jar set up by such impact. The same jarring action takes place whether the stem be raised or lowered to trip the joint.

Also among the objects of the invention is the provision of means whereby circulation may be maintained through the jar, a feature readily understood and appreciated by those skilled in the art.

The device is so constructed that it is sufficiently sturdy and strong to stand up under the exceptionally severe service conditions to which it is exposed, and while it is highly efficient in operation, it has no mechanical complications and is easily manufactured.

Other objects and novel features of the invention will be apparent from the following detailed specification, reference being made to the accompanying drawings, in which:

Fig. 1 shows our device in association with a fishing string;

Fig. 2 is a longitudinal, medial section through an embodiment of our invention, the telescopic joint thereof being fully contracted;

Fig. 3 is a section on line 3—3 of Fig. 2;

Fig. 4 is a view similar to Fig. 2 but showing the telescopic joint fully expanded, and one of the joint members being rotated through about 90° from the position of Fig. 2;

Fig. 5 is a section on line 5—5 of Fig. 4;

Fig. 6 shows a modification of the invention; and

Fig. 7 is a section on line 7—7 of Fig. 6.

In Fig. 1 of the drawings, we have indicated a usual rotary table 10 adapted to be rotated through power shaft 11 by any suitable means (not shown). Through the center of table 10 extends grief pipe 12, the latter being of polygonal cross section and being adapted to be reciprocated vertically through table bushings 13. As is usual, these bushings hold the table and grief pipe from relative rotation, so power applied by shaft 11 rotates the grief pipe and the fishing stem 14 suspended therefrom. Pipe 12 is tubular, the bore thereof communicating with the fishing stem bore and also with the swiveled circulating head 15 which carries a bail 16 to receive hook 17 of the usual hoisting tackle (not shown) whereby the fishing string is raised and lowered.

Hose 18 is adapted to introduce circulating fluid to head 15 and thence pass it through pipe 12 and stem 14 in the usual manner. The purpose of circulation is well understood and therefore need not be discussed here, except to say that it is highly desirable that the fluid be passed without interruption through the jars and through the tool or equipment suspended from the jars.

At 19 is indicated a broken section of drill pipe, there being a collar 20 threaded on the upper end thereof. It will be assumed that pipe 19 is held fast against rotation in the hole or casing C, that collar 20 is connected by a left hand thread to pipe 19, and that the collar must be unscrewed before said pipe can be gripped by a pick-up tool. It will also be assumed that the usual lengths 14ª of which fishing stem 14 is made up, are coupled by right-hand threaded tool joints 14ᵇ. Thus, when connection is made through our tool between the fishing stem and collar 20, and the stem is rotated right handedly, the joints in said stem are taken up, while there will be a tendency to unscrew the left hand threaded collar 20 from pipe 19. Of course, where left hand rotation of the work is required to loosen it, the stem sections will be coupled by left hand threaded tool joints so the latter will not be loosened by left hand rotation.

Connected to the lowermost tool joint 14ᵇ is our improved jar which is generally designated by numeral 21. The jar includes a telescopic joint made up of members 22 and 23; member 23 being a sleeve consisting of threadably connected sections 24, 25 and 26; and member 23 being a tubular plunger fitted in and capable of limited longitudinal and rotative movement with respect to the sleeve. Plunger 23 has a centrally located portion 27 which is of increased diameter and provides upwardly and downwardly facing shoulders 28 and 29, respectively. Plunger portion 27 has a running fit within the bore of the sleeve section 25; the upper end 30 of the plunger extends through and has a sliding fit in bore 31 of sleeve section 25; and the lower end 32 of the plunger extends through and has sliding fit in bore 33 of sleeve section 26. A tubular stem 34 extends from plunger end 31 and has sliding fit in the reduced bore 35 of sleeve section 24. At the junction of bores 31 and 35 is formed a downwardly facing shoulder 36 against which the upper end 30' of the plunger, proper, may abut for limiting upward movement of the plunger with respect to the sleeve. The upper end 37 of sleeve section 26 provides an upwardly facing shoulder adapted to be engaged by plunger shoulder 29 for limiting upward movement of the plunger with respect to the sleeve, it being noted that the stroke of the jar is determined by the difference in distance between plunger shoulders 29—30' and between sleeve shoulders 36—37. Of course, other means may be employed for limiting the extent of relative longitudinal movement between plunger and sleeve, but the means illustrated is preferred due to its obvious simplicity and effectiveness.

The upper end 38 of sleeve 22 is adapted for threadable connection to lowermost tool joint 14ᵇ, while the lower end of plunger 23 is adapted for connection to a usual tool joint 39 whereby a tool such as over-shot or left hand die 40 is joined to the jar.

It is evident that plunger 23 has ample bearing in sleeve 22 and that circulation may be maintained through the plunger and tool 40 without undue loss of pressure or leakage of the fluid into or around the sleeve, irrespective of the relative movement which may occur between plunger and sleeve.

On plunger 23 we have shown two diametrically opposite stop lugs 41, though our invention is not limited to any particular number. Extending inwardly from the peripheral face of sleeve section 25 are two horizontally disalined sets of stop lugs, the upper set consisting of diametrically opposite lugs 42, and the lower set consisting of diametrically opposite lugs 43; a given lug 42 and a given lug 43 being angularly spaced or out of vertical alinement as clearly shown in Fig. 3. Of course, lugs 42 and 43 may be varied in number and the angular spacing of the lugs in a given set with respect to the lugs in the other set may be varied, all without departing from the spirit and scope of the invention. Preferably, the under faces of lugs 42 and the upper faces of lugs 43 are in a common horizontal plane though it lies within the scope of our invention to vertically space said upper and lower faces when the plunger is provided with vertically spaced lugs, as will be later described in connection with Figs. 6 and 7.

When the telescopic joint is fully contracted (Fig. 2) lugs 41 are entirely in the horizontal plane of lugs 42, while when the joint is fully expanded the plunger lugs are fully in the horizontal plane of sleeve lugs 43 (Fig. 4).

Now assume that tool 40 is in operative engagement with collar 20 and the jar fully contracted as in Fig. 2. Table 10 is now rotated to twist stem 14 right handedly, it being remembered that collar 20 and hence plunger 23 are held from rotation due to the overly tight threaded connection between collar 20 and pipe 19. At the initiation of stem rotation, sleeve lugs 42 are brought into engagement with plunger lugs 41 (Fig. 3) but since the plunger is held against rotation, the movement of the sleeve is then checked and continuation of the table rotation places the stem under considerable torsional strain. Table 10 is rotated a varying amount to place the stem under the particular degree of torsional strain deemed necessary for a given job. It may be here stated that in ordinary drilling operations where the drill stem is several thousand feet long it is not unusual to twist the upper end of the stem seven or eight complete turns before the tool at the lower end of the stem starts to turn, this without parting the stem, so it will be seen it is perfectly feasible to twist the fishing string in the manner described.

Table 10 is then held in any suitable manner against reverse rotation (for instance, by engaging a pawl 11$^a$ with a suitable ratchet wheel or notched disk 11$^b$ on power shaft 11).

The hoisting tackle is then utilized to raise stem 14 and with it sleeve 22, sleeve lugs 42 sliding longitudinally over plunger lugs 41. As soon as lugs 42 vertically clear lugs 41 the sleeve is rotated right handedly due to it being under torsional strain, but since the lower set of sleeve lugs (43) are now in the horizontal plane of the plunger lugs, the sleeve may only rotate through 90°, or into the position of Figs. 4 and 5. Of course, by varying the relative position of the several lugs, the allowable rotation or rotative stroke of the sleeve may be varied.

It will be seen that the departure of lugs 43 from lugs 41 is in the nature of a "trip" action, and that the sleeve is rotated swiftly so lugs 42 impact sharply with lugs 41 and thereby impart a sudden rotative jar or shock to the plunger, and since collar 20 has left hand threads, this rotative jar directed in a right hand rotative direction tends to unscrew said collar.

If the collar does not then come loose, the stem may be again placed under torsional strain by rotating table 10 right handedly, and said stem allowed to gravitate. This movement slides lugs 43 over lugs 41 until they clear, whereupon the sleeve rotates due to its torsional strain, bringing lugs 42 sharply into contact with lugs 41 to jar the plunger again. These actions may be repeated until the collar threads are loosened from the pipe 19 and if the jarring is kept up, said collar is unscrewed by successive quarter revolutions of the stem. Or if the collar is loosened by the first few shocks, the stem may be rotated right handedly by the table to complete the unscrewing of the collar, whichever lugs 42 or 43 which happen to be in engagement with lugs 41 serving to transmit the rotary movement of the stem through the sleeve and plunger to the collar.

Of course, if the stem is placed under such initial torsional strain that said strain is not dissipated when the jar is tripped, table 10 need not be rotated between successive longitudinal strokes of the sleeve until all the effective twist has been taken out of the stem.

In Fig. 6 we have shown a modification wherein there are provided two vertically spaced sets of lugs 41$^a$ and 41$^b$ on plunger 23$^a$, and the sets of sleeve lugs 42$^a$ and 43$^a$ are vertically spaced. The several lugs are so proportioned and relatively positioned, however, that as sleeve 22$^a$ moves upwardly (similarly to the manner described in connection with sleeve 22 in Figs. 2 and 4) lugs 43$^a$ are brought into horizontal alinement with plunger lugs 41$^b$ just as sleeve lugs 42$^a$ leave plunger lugs 41$^a$. Lugs 41$^a$ and 41$^b$ are thus adapted alternately to act as disengageable means for holding the sleeve and plunger against relative rotation in given directions, and as plunger shoulders to receive the jarring impact from the associated lugs of the sleeve.

It is believed a full understanding of the invention will be had from the foregoing, but it is to be understood the drawings and description are to be considered merely as illustrative of and not restrictive on the broader claims appended hereto, for various changes in design, structure and arrangement may be made without departing from the spirit and scope of said claims.

We claim:

1. In combination with a stem of well pipe extending into a well in which there is an element resisting longitudinal and rotative movement, a rotational jar intermediate and operatively connecting said stem and element, said jar including two members adapted to have limited relative longitudinal and rotative movement, one of said members being connected to and movable by the stem, and the other member being operatively connected to and movable with said element, disengageable means on the two members for holding them against relative rotation, impact shoulders on the two members, which shoulders are angularly spaced when the members are held against relative rotation; means for putting said stem under torsional strain when said holding means are engaged, and means for disengaging said holding means whereby the first mentioned member is released for rapid rotation by virtue of the torsional strain in the stem; the impact shoulder of the said member being adapted to contact sharply with the impact shoulder on the other member by virtue of said rapid rotation and thereby to impart a rotational jar to said other member and the element connected thereto.

2. In combination with a stem of well pipe extending into a well in which there is an element resisting longitudinal and rotative movement, a rotational jar intermediate and operatively connecting said steam and element, said jar including two members adapted to have limited relative longitudinal and rotative movement, one of said members being connected to and movable by the stem, and the other member being operatively connected to and movable with said element, disengageable means on the two members for holding them against relative rotation, said holding means being disengageable by virtue of longitudinal movement of said first mentioned member with respect to the second mentioned member, impact shoulders on the two members, which shoulders are angularly spaced when the members are held against relative rotation; means for putting said stem under torsional strain when said holding means are engaged, and means for disengaging said holding means whereby the first mentioned member is released for rapid rotation by virtue of the torsional strain in the stem; the impact shoulder of the said one member being adapted to contact sharply with the impact shoulder on the other member by virtue of said rapid rotation and thereby to impart a rotational jar to said other member and the element connected thereto.

3. A device of the character described, embodying two telescopically joined and relatively rotatable elongated members, means on the members adapted to coact for limiting the extent of their relative longitudinal movement, angularly spaced and horizontally disalined shoulders on one of the members, and a lug on the other member, said shoulders being so arranged with respect to one another and to the lug, that longitudinal movement of said one member with respect to the other, moves one of said shoulders out of horizontal alinement with said lug, and moves the other shoulder into horizontal alinement with the lug; the lug being of less angular extent than is the angular spacing of said shoulders.

4. A device of the character described, embodying two telescopically joined and relatively rotatable elongated members, means on the members adapted to coact for limiting the extent of their relative longitudinal movement, angularly spaced and horizontally disalined shoulders on one of the members, and a lug on the other member, said shoulders being so arranged with respect to one another and to the lug, that longitudinal movement of said one member with respect to the other moves one of said shoulders out of horizontal alinement with said lug, and moves the other shoulder into horizontal alinement with the lug; the lug being of less angular extent than is the angular spacing of said shoulders; said shoulders being further so relatively arranged that just as one shoulder passes completely out of alinement with the lug, the other shoulder reaches a position of alinement with said lug.

In witness that we claim the foregoing we have hereunto subscribed our names this 27th day of June, 1925.

HENRY P. SCANLON.
ELMER R. PRICE.